(12) United States Patent
Thiede et al.

(10) Patent No.: US 11,118,663 B2
(45) Date of Patent: Sep. 14, 2021

(54) CLUTCH ARRANGEMENT

(71) Applicant: ZF FRIEDRICHSHAFEN AG, Friedrichshafen (DE)

(72) Inventors: Andreas Thiede, Dittelbrunn (DE); Markus Walper, Würzburg (DE); Daniel Pinke, Poppenhausen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 16/747,880

(22) Filed: Jan. 21, 2020

(65) Prior Publication Data
US 2020/0232521 A1 Jul. 23, 2020

(30) Foreign Application Priority Data
Jan. 22, 2019 (DE) ...................... 10 2019 200 731.7

(51) Int. Cl.
*F16D 13/68* (2006.01)
*F16H 45/02* (2006.01)

(52) U.S. Cl.
CPC ............. *F16H 45/02* (2013.01); *F16D 13/68* (2013.01); *F16H 2045/0278* (2013.01)

(58) Field of Classification Search
CPC ............. F16D 13/68; F16H 45/02–2045/0294
See application file for complete search history.

(56) References Cited

U.S. PATENT DOCUMENTS

| 4,317,510 A | * | 3/1982 | Staub, Jr. | ................. | F16H 45/02 192/3.29 |
| 4,969,543 A | * | 11/1990 | Macdonald | ............. | F16H 45/02 192/113.36 |
| 2017/0335937 A1 | * | 11/2017 | Depraete | ................. | F16H 45/02 |

FOREIGN PATENT DOCUMENTS

| DE | 195 15 302 | 11/1995 |
| DE | 198 36 775 | 3/1999 |
| DE | 198 08 299 | 9/1999 |
| DE | 103 09 381 | 9/2004 |
| DE | 198 81 000 | 4/2010 |

* cited by examiner

*Primary Examiner* — David R Morris
(74) *Attorney, Agent, or Firm* — Cozen O'Connor

(57) ABSTRACT

A clutch arrangement has a clutch housing and a clutch element carrier, one of which receives at least one clutch element and the other of which is configured as a friction area carrier for a friction area so that, to produce a frictional engagement connection, the clutch element can be brought into operative connection with the friction area or, to cancel the frictional engagement connection, the clutch element can be separated from the friction area. The clutch element has a support for a friction facing, and the clutch element has a holding device radially adjacent to the friction facing for receiving the support of the clutch element. The support has at its side opposite the friction facing a further friction facing acting as seal.

4 Claims, 3 Drawing Sheets

CLUTCH ARRANGEMENT

BACKGROUND OF THE INVENTION

1. Field of the Invention

The invention is directed to a clutch arrangement with a clutch housing and with a clutch element carrier.

2. Description of the Related Art

A clutch element of this kind is known from DE 198 36 775 B4. The support of the clutch element is fastened radially adjacent to the friction facing to a clutch element carrier formed as clutch piston by riveting. Through axial displacement of the clutch piston in direction of the clutch housing, the clutch element comes in contact with the friction area of the clutch housing by its friction facing provided at the clutch housing side such that a frictional engagement connection is formed between the friction facing and the friction area and accordingly also between the clutch housing and the clutch element carrier. In this way, the movement of the clutch housing is transmitted to the clutch device. Conversely, when the friction facing of the clutch element is disengaged from the friction area of the clutch housing through axial displacement of the clutch piston in opposite direction, this frictional engagement connection between the friction facing and the friction area and, accordingly, also between the clutch housing and the clutch element carrier is canceled again. There are no steps provided for sealing the clutch element relative to the clutch element carrier so that unwanted accumulations of fluid in dead spaces cannot be ruled out.

The possibility of fastening the support of the clutch element to the clutch housing and fastening the friction area to the clutch element carrier is merely mentioned in DE 198 36 775 B4. This reversal does not bring about a functional change in the manner of operation.

SUMMARY OF THE INVENTION

An object of the invention is to effectively rule out the accumulation of unwanted fluid in dead spaces in a simple technical manner.

The above-stated object may be met in a clutch arrangement with a clutch housing and with a clutch element carrier, one constructional unit of which, i.e., clutch housing or clutch element carrier, is configured to receive at least one clutch element and the other constructional unit is configured as friction area carrier for at least one friction area so that, in order to produce a frictional engagement connection, the at least one clutch element can be brought at least substantially into operative connection with the at least one friction area or, in order to cancel the frictional engagement connection, the at least one clutch element can be at least substantially separated from the at least one friction area, and the at least one clutch element has a support for at least one friction facing, and the at least one clutch element has a holding device radially adjacent to the friction facing for receiving the support of the clutch element.

It is especially important that the support has, at its side opposite the friction facing, a further friction facing acting as seal. In this way, in a two-line converter, the sealing of a pressure space, which is located axially between the clutch housing and the clutch element carrier, and a toroidal space which extends substantially on the opposite side of the clutch element carrier, particularly of a clutch piston, ensures a good seal, namely, in particular when there is an operative connection between the clutch element carrier and the clutch housing.

A further advantage of the further friction facing results for the following reason: elasticity is an important characteristic of every organic friction facing. Because of this elasticity, it is capable of experiencing a compression when acted upon by an axial force and, when relieved, at least substantially resumes its original dimensions. This makes it possible to compensate for unevenness in the friction surface.

Every friction surface has geometric tolerances as a function of industrial manufacture. For the friction surface, these geometric tolerances are principally axial runout, proclivity and total planarity.

During the operation of the friction surface, these irregularities excite vibrations in the respective clutch device, which lead to unwanted leakage and/or unwanted torsional vibrations.

The basic set of problems in friction facings can be mitigated by the further friction facing, since the compression conditioned by the elasticity is doubled while the extent of transmitted torque remains constant. If only the quantity of friction surfaces varies in a clutch device of this kind, the transmitted torque is always directly proportional to the quantity of friction surfaces. The basic conflicting goals of twofold path compensation without doubled torque through deactivation of a friction surface is solved in this way.

In a particularly preferred manner, in order to form the holding device by a displacement process through plastic deformation of at least one of the participating component parts comprising the clutch element carrier, the clutch housing or support of the clutch element, the clutch element carrier and/or the support of the clutch element or the clutch housing and/or the support of the clutch element are/is connected to at least one other participating component part in that material of the at least one participating component part is displaced into at least one of the other participating component parts and a press fit connection is achieved in the contact area in this way. Alternatively, at least one participating component part can have an opening into which material of the at least one further participating component part is displaced by the displacement process and a press fit connection is achieved in the contact area in this way.

A displacement process of this kind may also be referred to as clinching. A joining technique of this kind is considerably advantageous particularly when a clutch arrangement is at least partially filled with fluid medium, since an efficient liquid-tight connection can be produced in this way between the clutch element carrier and the support of the clutch element or between the clutch housing and the support of the clutch element. A displacement process of this kind has the additional advantage that it can be carried out without the use of additional material.

In an alternative construction of the holding device, a riveting or a bonding connection is produced between the two component parts, for example, by gluing, welding or soldering.

Alternatively, however, a fixed connection between the two component parts can also be dispensed with and, instead, one component part, for example, the clutch element, can be floatingly supported on the other component part, for example, the clutch device. To this end, the clutch element carrier can have a plurality of axial projections for receiving the clutch element which penetrate sufficiently deep into corresponding cutouts of the clutch element for purposes of an axially displaceable centering of the clutch element relative to the clutch element carrier that the clutch element cannot detach from the operative area of the axial projections even under maximum axial displacement.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The clutch arrangement is described in the following with reference to embodiment examples. In the drawings.

DETAILED DESCRIPTION OF THE PRESENTLY PREFERRED EMBODIMENTS

Figure 1:
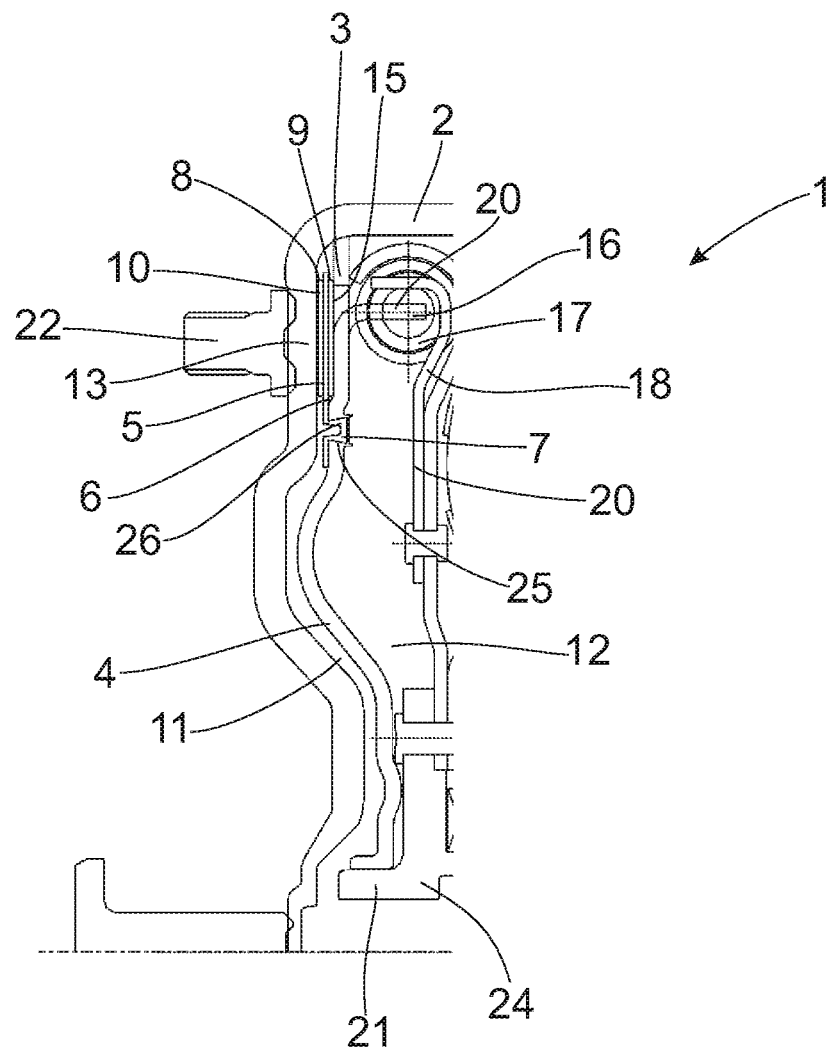
FIG. 1 is a clutch housing and a clutch device, wherein a clutch element is fastened to a clutch element carrier of the clutch device.

FIG. 1 shows an area of a clutch arrangement 1 having a clutch housing 2 and a clutch device 3. The clutch device 3 is provided with a clutch element carrier 4 in the form of a clutch piston and with a clutch element 5 fastened thereto. The clutch element 5 has a support 6 having a first friction facing 8 at its side facing the clutch housing 2 and a second friction facing 9 opposite the clutch housing 2. Radially adjacent to these friction facings, for example, radially inwardly thereof, a holding device 26 acts between the clutch element carrier 4 and the support 6 of the clutch element 5. This holding device 26 is connected by a displacement process through plastic deformation of the support 6 of the clutch element 5 in direction of the clutch element carrier 4 and, conditional upon this, also through plastic deformation of the clutch element carrier 4 in that material of the one participating component part, i.e., the support 6 of the clutch element 5, is displaced into the other respective component part, i.e., into the clutch element carrier 4, and a press fit connection is achieved in this way between the two component parts 4 and 6 in a contact area 25. Alternatively, however, the clutch element carrier 4 can also have a recess 7 into which material of the support 6 of the clutch element 5 is displaced so that a press fit connection is achieved between the two component parts 4 and 6 in a contact area 25. A displacement process of this kind may also be referred to as clinching. A joining technique of this kind has substantial advantages when a clutch arrangement 1 is at least partially filled with fluid medium, since a liquid-tight connection operative between the clutch element carrier 4 and the support 6 of the clutch element can be produced in this way. Accordingly, a first pressure space 11 extending axially between the clutch housing 2 and the clutch element carrier 4 is isolated from a second pressure space 12 located at the opposite side of the clutch element carrier 4. A predetermined volume flow of fluid can pass between the two pressure spaces 11 and 12 even when the clutch device 3 is closed, as is shown in FIG. 1, so that a selective pressure exchange takes place when at least one of the two friction facings 8, 9 is provided with a fluting, not shown. The volume flow of fluid and, therefore, the pressure exchange takes place from the pressure space with the higher pressure level to the pressure space with the lower pressure level when the clutch device 3 is engaged, i.e., closed, according to FIG. 3 from pressure space 12 into pressure space 11. Conversely, when the clutch device 3 is disengaged, i.e., open, pressure space 11 is supplied, in a manner not shown, with a positive pressure relative to pressure space 12 so that the volume flow of fluid is then carried out from pressure space 11 into pressure space 12.

As an alternative to the holding device 26 described above, it is possible to produce a riveting or a bonding connection between the clutch element carrier 4 and the support 6 of the clutch element 5, for example, by gluing, welding or soldering.

To engage or disengage the clutch device, the clutch element carrier 4 is axially displaceable between a first position, in which it presses the clutch element 8 and therefore the first friction facing 8 against a friction area 10 at the clutch housing 2 acting as friction area carrier 13, and a second position in which it is spaced apart from the friction area 10 at the clutch housing 2 and therefore no longer exerts any pressing force on the clutch element 8. The first position is occupied when the clutch device 3 is engaged and the pressure in the first pressure space 11 is accordingly lower than the pressure in the second pressure space 12. In contrast, the second position is occupied when the clutch device 3 is disengaged and the pressure in the first pressure space 11 is accordingly higher than the pressure in the second pressure space 12.

When the clutch device 3 is engaged, the second friction facing 9 acts as a seal 15 particularly when it is formed without fluting or with less fluting compared to friction facing 8 so that there is at least no appreciable exchange of pressure medium, and therefore also at least no appreciable pressure exchange, between the two pressure spaces 11 and 12. This is important because an exchange of pressure medium and, therefore, an exchange of pressure could reduce the pressing force acting upon the clutch element carrier 4.

In the radially outer area, the clutch element carrier 4 has folds 16 which act upon a circumferential spring set 17 of a torsional vibration damper 18 and accordingly serve as input 20 of the torsional vibration damper 18. The circumferential spring set 17 is supported circumferentially on the other side at an output 20 of the torsional vibration damper 18 which is secured to a driven end 21 such as a transmission input shaft, not shown, so as to be fixed with respect to rotation relative to it via a torsional vibration damper hub 24.

Studs 22 which serve to connect the clutch housing 2 to a driving end such as the crankshaft of an internal combustion engine, not shown, are provided at the side of the clutch housing 2 opposite the friction area 10.

Figure 2:
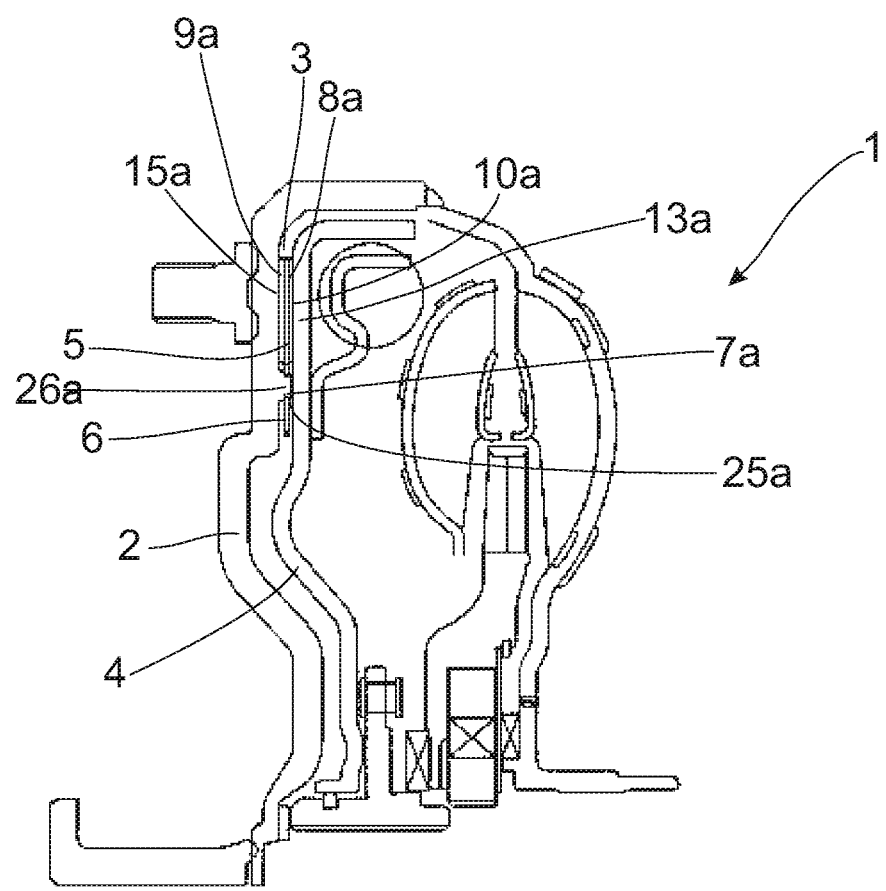
FIG. 2 is the same as FIG. 1, but with a clutch element fastened to the clutch housing.

In the construction of the clutch arrangement 1 according to FIG. 2, the clutch element 5 is fastened not to the clutch element carrier 4 but, instead, to the clutch housing 2 on the side of the clutch housing 2 facing the clutch element carrier 4. Accordingly, the friction area 10a is provided at the clutch element carrier 4 serving as friction area carrier 13a at the side of the clutch element carrier 4 facing the clutch housing 2. Accordingly, friction facing 9a which faces clutch housing 2 is allotted the function of seal 15a, while the other friction facing 8 is responsible for producing or canceling an operative connection between clutch housing 2 and clutch element carrier 4.

In this construction, the support 6 of the clutch element 5 is connected to the clutch housing 2 radially adjacent to the friction facings 8a, 9a, for example, radially inwardly thereof, via the holding device 26a. Holding device 26a corresponds in terms of construction to the holding device 26 already described referring to FIG. 1, but the displacement process is now carried out through plastic deformation of clutch housing 2 in direction of support 6 of clutch element 5 and, conditional thereon, also through plastic deformation of support 6 of clutch element 5 in that material of the one participating component part, i.e., of the clutch housing 2, is displaced into the other respective component part, i.e., into the support 6 of clutch element 5, and a press fit connection is accordingly achieved between the two component parts 2 and 6 in a contact area 25a. Alternatively, however, the support 6 can also have a recess 7a into which the material of the clutch housing 2 is displaced so that a press fit connection is achieved between the two component parts 2 and 6 in a contact area 25a.

In an alternative to the above-described holding device 26a, it is also possible to produce a riveting or a bonding connection between the clutch housing 2 and the support 6 of the clutch element 5, for example, by gluing, welding or soldering.

Figure 3:
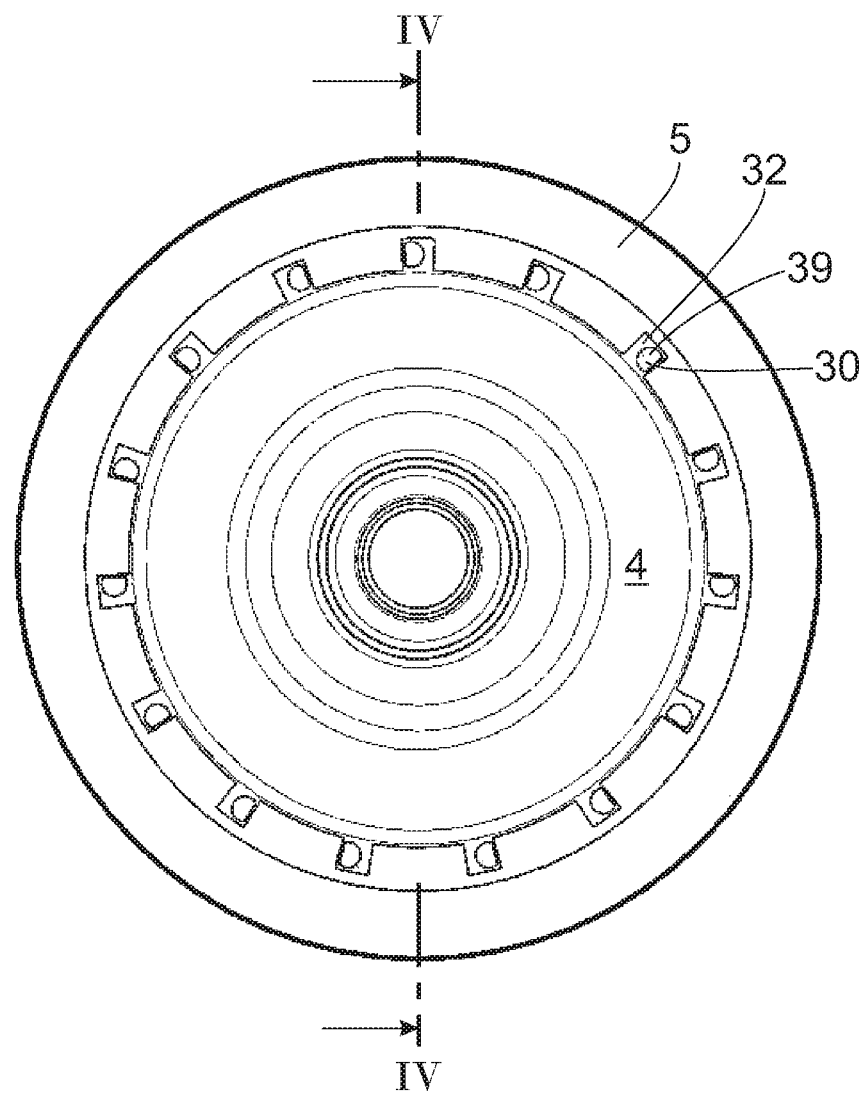
FIG. 3 is a top view of a clutch device in which the clutch element is merely operatively connected to the clutch element carrier.
Figure 4:
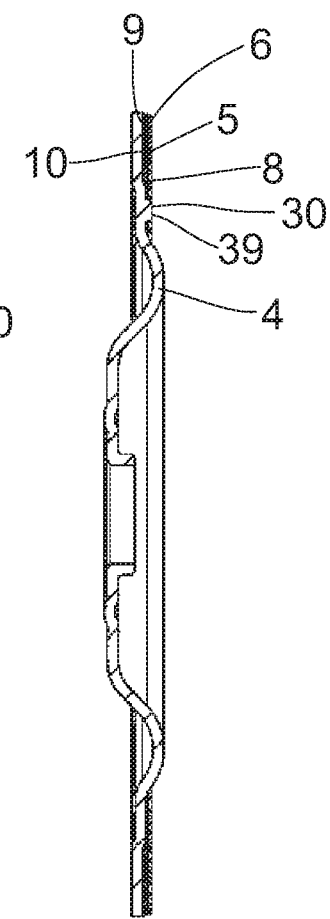
FIG. 4 is the same as FIG. 3, but in a sectional view along line IV-IV of FIG. 3.

In FIGS. 3 and 4, the clutch element 5 is floatingly accommodated at the clutch element carrier 4 which, to this end, has molded pins 39 as axial projections 30 facing in direction of the clutch element 5. The support 6 of clutch element 5 is placed on the axial projections 30 in such a way that they project axially into a cutout 32 in the clutch element 5. The axial projections 30 must be longer axially than the maximum possible axial clearance in the clutch housing 2 during operation so that the clutch element 5 cannot disengage from the clutch element carrier 4. Functionally, the solution referring to the present figure corresponds to that according to FIG. 1, since the clutch element 5 is associated with the clutch element carrier 4, and the first friction facing 8 is accordingly responsible for producing or canceling an operative connection between the clutch housing 2 and the clutch element carrier 4, and the second friction facing 9 acts as seal 15.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

REFERENCE NUMERALS 1 clutch arrangement
2 clutch housing
3 clutch device
4 clutch element carrier
5 clutch element
6 support
7 recess
8 first friction facing
9 second friction facing
10 friction area
11 first pressure space
12 second pressure space
13 friction area carrier
15 seal
17 circumferential spring set
18 torsional vibration damper
19 input
20 output
21 driven end
22 stud
24 torsional vibration damper hub
25 contact area
26 holding device
30 axial projection
32 cutout
39 pins

The invention claimed is:

1. A clutch arrangement (1) comprising:
a clutch housing (2); and
a clutch element carrier (4),
wherein one selected from the group consisting of the clutch housing (2) and the clutch element carrier (4), is configured to receive at least one clutch element (5), and the other from the group is configured as a friction area carrier (13; 13a) for at least one friction area (10; 10a) so that, to produce a frictional engagement connection, the at least one clutch element (5) can be brought at least substantially into operative connection with the at least one friction area (10; 10a) or, to cancel the frictional engagement connection, the at least one clutch element (5) can be at least substantially separated from the at least one friction area (10; 10a),
wherein the at least one clutch element (5) comprises a support (6) for at least one friction facing, and the at least one clutch element (5) comprises a holding device (26) radially adjacent to the friction facing for receiving the support (6) of the clutch element (5),
wherein the support (6) comprises, at its side opposite the friction facing (8; 8a), a further friction facing (9; 9a) configured as a seal (15; 15a), and
wherein the clutch element carrier (4) comprises a plurality of axial projections (30) configured to receive the clutch element (5), the axial projections (30) of which penetrate sufficiently deep into corresponding cutouts (32) of the clutch element (5) so as to achieve an axially displaceable centering of the clutch element (5) relative to the clutch element carrier (4) such that the clutch element (5) is not detachable from an operative area of the axial projections (30) even under maximum axial displacement.

2. The clutch arrangement (1) according to claim 1, in which, the clutch element carrier (4) and/or the support (6) of the clutch element (5) or, alternatively, the clutch housing (2) and/or the support (6) of the clutch element (5), to form the holding device (26; 26a), are/is connected by a displacement process through plastic deformation of at least one of component parts comprising the clutch element carrier (4), clutch housing (2) and support (6) of the clutch element (5), respectively, to at least one other of these component parts (2, 4, 6), wherein material of at least one component part (2, 6) of the component parts (2, 4, 6) is displaced into the at least one other component part (4; 6) of the component parts (2, 4, 6) so as to achieve a press fit connection in a contact area (25; 25a).

3. The clutch arrangement (1) according to claim 2, wherein the at least one other component part (4; 6) has an opening (7) into which the material of the at least one component part (2; 6) is displaced so as to achieve the press fit connection in the contact area (25; 25a).

4. The clutch arrangement (1) according to claim 1, wherein the holding device (26; 26a) is bondingly formed at the support (6) of the clutch element (5) opposite the clutch element carrier (4) or opposite the clutch housing (2).

* * * * *